(12) United States Patent
Basir

(10) Patent No.: US 8,880,133 B2
(45) Date of Patent: Nov. 4, 2014

(54) VEHICLE COMMUNICATION DEVICE

(75) Inventor: Otman A. Basir, Waterloo (CA)

(73) Assignee: Intelligent Mechatronic Systems Inc., Waterloo, Ontario (CA)

( * ) Notice: Subject to any disclaimer, the term of this patent is extended or adjusted under 35 U.S.C. 154(b) by 1783 days.

(21) Appl. No.: 11/949,251

(22) Filed: Dec. 3, 2007

(65) Prior Publication Data

US 2008/0132270 A1 Jun. 5, 2008

Related U.S. Application Data

(60) Provisional application No. 60/868,135, filed on Dec. 1, 2006, provisional application No. 60/891,284, filed on Feb. 23, 2007.

(51) Int. Cl.

| | | |
|---|---|---|
| *H04B 1/10* | (2006.01) | |
| *H04M 1/00* | (2006.01) | |
| *G06F 7/00* | (2006.01) | |
| *G08G 1/127* | (2006.01) | |
| *G07C 5/00* | (2006.01) | |
| *B60W 50/04* | (2006.01) | |
| *B60W 50/02* | (2012.01) | |
| *G07C 5/08* | (2006.01) | |
| *B60W 50/08* | (2012.01) | |

(52) U.S. Cl.
CPC .............. *G07C 5/008* (2013.01); *G08G 1/127* (2013.01); *B60W 50/0205* (2013.01); *G07C 5/085* (2013.01); *B60W 50/045* (2013.01); *B60W 50/08* (2013.01); *B60W 2050/046* (2013.01)
USPC ............... 455/575.9; 455/550.1; 455/423; 340/438; 340/933; 701/31.4

(58) Field of Classification Search
USPC ......... 455/550.1, 423; 340/438, 933; 701/200
See application file for complete search history.

(56) References Cited

U.S. PATENT DOCUMENTS

| | | | |
|---|---|---|---|
| 4,083,003 A | | 4/1978 | Haemmig |
| 4,989,144 A | * | 1/1991 | Barnett, III ..................... 705/29 |
| 5,488,360 A | | 1/1996 | Ray |
| 5,760,742 A | | 6/1998 | Branch et al. |
| 5,938,706 A | | 8/1999 | Feldman |
| 6,088,650 A | | 7/2000 | Schipper et al. |
| 6,147,598 A | | 11/2000 | Murphy et al. |
| 6,622,083 B1 | | 9/2003 | Knockeart et al. |
| 6,972,669 B2 | * | 12/2005 | Saito et al. .................... 340/438 |
| 7,069,118 B2 | | 6/2006 | Coletrane et al. |
| 7,117,075 B1 | | 10/2006 | Larschan et al. |
| 7,191,040 B2 | | 3/2007 | Pajakowski et al. |

(Continued)

FOREIGN PATENT DOCUMENTS

GB 2329970 4/1999

OTHER PUBLICATIONS

International Search Report and Written Opinion, mailed Mar. 20, 2008.

*Primary Examiner* — Ariel Balaoing
(74) *Attorney, Agent, or Firm* — Carlson, Gaskey & Olds P.C.

(57) ABSTRACT

An example vehicle communication device includes a vehicle installed unit and a portable unit in communication with the vehicle installed unit. The portable unit communicates a message through the vehicle installed unit to a remote location, and the vehicle installed unit adds information to the message.

28 Claims, 2 Drawing Sheets

(56) References Cited

U.S. PATENT DOCUMENTS

| | | |
|---|---|---|
| 2001/0021640 A1 | 9/2001 | Lappe |
| 2003/0231550 A1* | 12/2003 | Macfarlane ................... 367/198 |
| 2004/0257210 A1 | 12/2004 | Chen et al. |
| 2005/0088320 A1* | 4/2005 | Kovach ......................... 340/933 |
| 2005/0174217 A1* | 8/2005 | Basir et al. ................. 340/425.5 |
| 2005/0285743 A1 | 12/2005 | Weber |
| 2006/0009885 A1* | 1/2006 | Raines et al. ..................... 701/1 |
| 2006/0101311 A1 | 5/2006 | Lipscomb et al. |
| 2006/0214783 A1 | 9/2006 | Ratnakar |
| 2006/0217858 A1 | 9/2006 | Peng |
| 2006/0271275 A1* | 11/2006 | Verma ........................... 701/200 |
| 2007/0050108 A1 | 3/2007 | Larschan et al. |

\* cited by examiner

VEHICLE COMMUNICATION DEVICE

CROSS REFERENCE TO RELATED APPLICATIONS

This application claims priority to U.S. Provisional Application No. 60/868,135, which was filed on 1 Dec. 2006, and to U.S. Provisional Application No. 60/891,284, which was filed on 23 Feb. 2007.

BACKGROUND OF THE INVENTION

This invention relates to a vehicle communication system. More particularly, this invention relates to wireless communications between a portable unit and a vehicle installed unit.

Vehicles are used for transportation. Some vehicles may have a communication system (e.g., GPIRS/CDMA modems) and a global positioning system (GPS). These systems enable a vehicle operator to communicate via email, phone, or text message, as well as determine the vehicle's geographical location. The operator typically accesses these systems from a unit installed in the vehicle.

Police officers commonly operate patrol vehicles that include vehicle installed units capable of communicating with a base station, such as a police headquarters. Within the vehicle, officers can communicate emergency situations, such as an attack or injury, to the police headquarters from the vehicle installed unit. When outside the vehicle, the officers cannot remotely access the vehicle installed unit. Instead, if additional help or assistance is required, the police officer must return to the vehicle or use a walky-talky based communication device, which limits the types of communications available to the officer.

Commercial truck drivers may need help or assistance when outside of their vehicle. If a truck driver is attacked outside of their truck they may not be able to communicate quickly and effectively to obtain needed assistance. If the same attack occurred in their truck, the truck driver could use the vehicle installed unit to notify others. Vehicle installed units including a GPS would help those assisting the truck driver to know the location of the vehicle.

When outside of the vehicle, the operator will not know if their vehicle is stolen. If the vehicle is stolen, a recovery process would not begin until the operator recognizes that the vehicle is missing. When outside the vehicle, the operator cannot utilize ordinary features of the unit, such as making a phone call or sending a text message. Instead, the operator typically carries a cell phone for calls outside the vehicle in addition to phone call capability through the vehicle installed unit within the vehicle.

It would be desirable for a vehicle operator to communicate with a vehicle installed unit when the vehicle operator is outside of the vehicle. It would be desirable for the vehicle operator to utilize routine functions of the vehicle installed unit when the operator is outside of the vehicle. It would be desirable to notify the operator immediately that the vehicle is stolen, and for the operator to access information about the vehicle when the operator is outside the vehicle.

SUMMARY

An example vehicle communication device includes a vehicle installed unit and a portable unit in communication with the vehicle installed unit. The portable unit communicates a message through the vehicle installed unit to a remote location, and the vehicle installed unit adds information to the message.

In another example, the vehicle communication device includes a vehicle installed unit and a vehicle interface module within the vehicle installed unit for connecting to a vehicle system. A portable unit communicates with the vehicle installed unit. The portable unit communicates with the vehicle interface module to obtain information from the vehicle system.

A vehicle communication method, including the steps of linking a portable unit to a vehicle based on the driver, operating the vehicle, storing vehicle information based on the driver.

BRIEF DESCRIPTION OF THE DRAWINGS

These and other features of the present invention can be best understood from the following specification and drawings, the following of which is a brief description.

DETAILED DESCRIPTION OF THE PREFERRED EMBODIMENT

Figure 1:
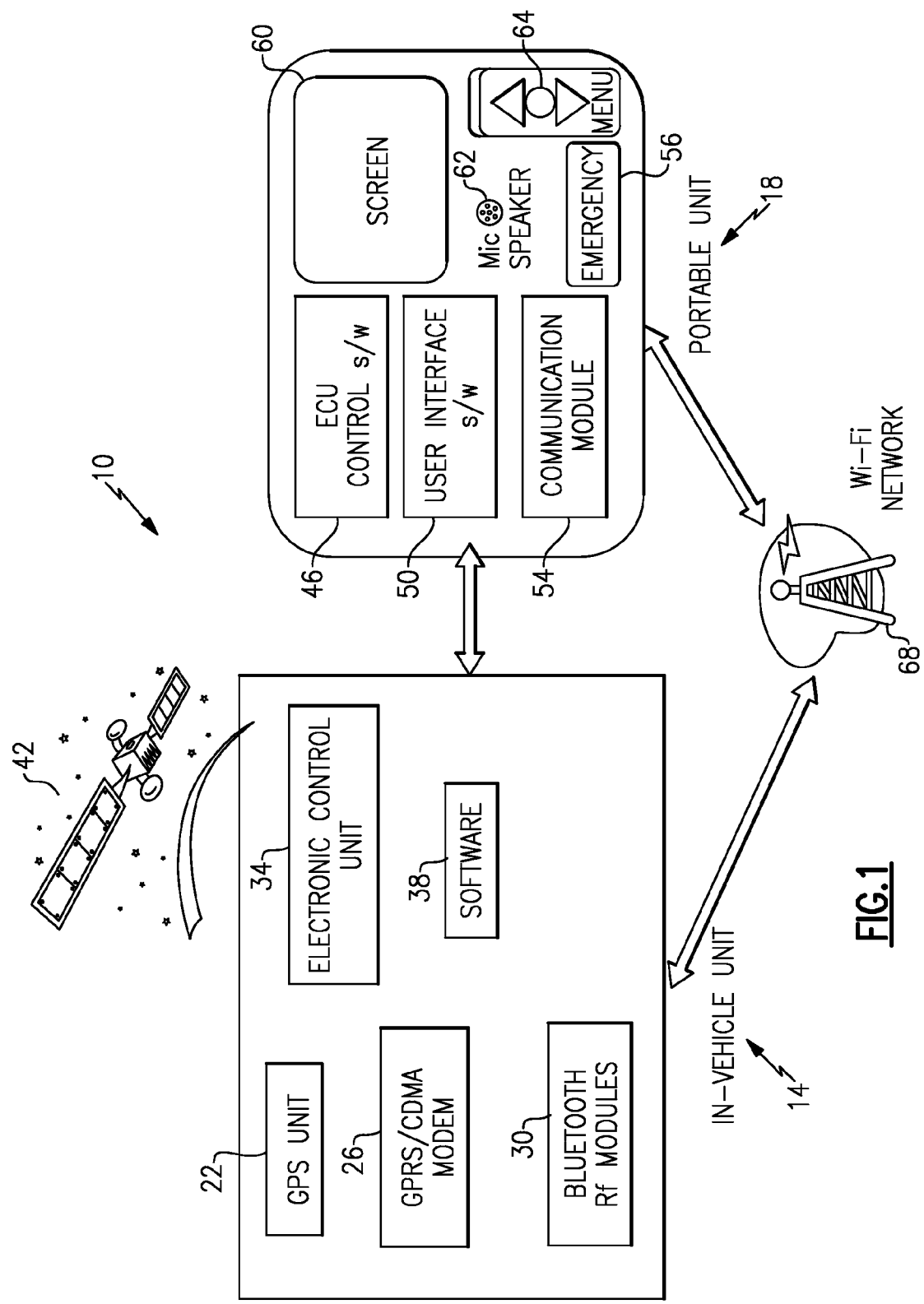
FIG. 1 schematically shows an example method of communicating between a vehicle installed unit and a portable unit.

A vehicle communication device 10 includes a vehicle installed unit 14 and a portable unit 18. In this example, the vehicle installed unit 14 includes a GPS 22, a GPRS/CDMA modem 26, a Bluetooth radio frequency module 30, an electrical control unit 34, as well as software 38 for operating these features. The example portable unit 18 includes an ECU control 46, a user interface 50, a communication module 54, an emergency button 56, a screen 60, a microphone/speaker assembly 62, and a menu control 64.

The vehicle installed unit 14 communicates wirelessly with the portable unit 18 via Bluetooth or other radio frequency, for example. The GPS 22 portion of the vehicle installed unit 14 communicates with a satellite 42 to determine the position of the vehicle installed unit 14 and an associated vehicle. When in the vehicle, the portable unit 18 communicates with the vehicle installed unit 14 either wirelessly or through a wired connection, such as Wi-Fi. The wireless connection is typically a direct wireless connection or an indirect wireless connection. The vehicle installed unit 14 reports driving data wirelessly through the satellite 42 or a wireless hub 68. In this example, reporting occurs when prompted by the wireless hub 68, when programmed by a vehicle user, and/or in events such as a vehicular crash, exit/entry of a geo zone, driving behavior pattern, etc.

The vehicle installed unit 14 also reports the vehicle location wirelessly. A user activates the emergency button 56 on the portable unit 18 to report the vehicle position from the vehicle installed unit 14. Alternatively, the vehicle installed unit 14 reports the vehicle location when prompted by the wireless network hub 68. The vehicle location is reported to the portable unit 18 for display on the screen 60. In addition to the vehicle location, the portable unit 18 obtains information on the screen 60 relating to the vehicle diagnostics and other vehicle data. This information relays wirelessly to the wireless network hub 68.

An example information exchange may include a hazardous material inspector, such as a gas line inspector, using the portable unit 18 to communicate through the vehicle installed unit 14 to the inspector's headquarters. The inspector selects the phone number via the portable unit 18, the vehicle installed unit 14 establishes a telephony connection from the portable unit 18 through the vehicle installed unit 14 to the inspector's headquarters. To place the call, the inspector may switch the portable unit 18 to a telephone mode, which enables the inspector to place calls via the portable unit 18.

The portable unit 18 enables the inspector to visit a job site outside the vehicle and still maintain substantial communication capability through the vehicle installed unit 14. In addition to voice based telephone communications, the inspector may use the portable unit 18 to send an SMS or other type of text message to the inspector's headquarters. The inspector may create a portion of the text message, and the vehicle installed unit 14 may automatically add information such as vehicle location. For example, the inspector may construct a text message describing a hazardous material spill, the vehicle installed unit 14 then adds location specific information (using the GPS unit 22) and relays the message to the inspector's headquarters. Although described in this example as having voice and SMS capability, it should be understood that the portable unit 18 may include other communication features common to today's cell phones, such as full email capability.

The portable unit 18 docks with the vehicle installed unit 14 or continues to communicate directly with the vehicle installed unit 14. When the user exits the vehicle, the user may choose to carry the portable unit 18 with them. The user may place the portable unit 18 with the user's pocket or carry the portable unit 18 in a convenient location, such as on the keychain. In this example, the user carries the portable unit 18 as the user exits the vehicle in a location convenient for actuating the emergency button 56 on the portable unit 18. When the user triggers the emergency button 56, a wireless signal communicates directly to the vehicle installed unit 14, which then reports the emergency to the wireless network hub 68 or communicates the emergency via another communication means of the vehicle installed unit 14.

The vehicle installed unit 14 may also place telephone calls via the GPRS/CDMA modem 26 to communicate the emergency situation. Software 38 within the vehicle installed unit 14 may execute a preprogrammed emergency profile which would involve dialing preprogrammed numbers, as well as notifying the network hub 68. Further, the program may notify the network hub 68 of the vehicle location using the GPS unit 22 within the vehicle installed unit 14. The wireless hub 68, over a server within the wireless hub network, maps the location of the vehicle to a geographical address and communicates the location to an emergency service provider. Further, the vehicle installed unit 14, after placing a call to the emergency service provider, may establish a voice connection between the service provider personnel and the user. The user communicates through the microphone/speaker assembly of the portable unit 18 to the service provider via the vehicle installed unit 14.

The user typically carries the portable unit 18 with them. Accordingly, if the portable unit 18 is away from the vehicle, and the vehicle moves, the movement may be without the user's knowledge or permission. That is, movement of the vehicle when the portable unit 18 is away from the vehicle may indicate that someone other than the user is moving the vehicle. In such a situation, the vehicle installed unit 14 can contact the appropriate authorities to begin recovering the vehicle, and there may be no need for the user to initiate the recovery process. The vehicle installed unit 14 may automatically contact the appropriate authorities as soon as the vehicle installed unit 14 detects vehicle movement away from the portable unit 18. The recovery process may include notifying the user, notifying the police, or other types of notification.

The portable unit 18 may establish a connection with the vehicle installed unit 14 for telephone communications between the vehicle installed unit 14 and a desired number in a non-emergency situation. The user chooses the desired number using the portable unit 18 and the associated menu bar 64. Once specified, the vehicle installed unit 14 calls the desired number. A voice connection is established between the portable unit 18 and the vehicle installed unit 14 enabling the user to communicate with the desired number. As a result, the portable unit 18 acts in this example as a telephone, enabling the user to choose a desired telephone number and to speak with the desired number via the vehicle installed unit 14.

In another example, the vehicle installed unit 14 receives incoming telephone calls and connects them to the portable unit 18, or other devices based on a programmable set of features. For example, the user may specify that incoming calls would connect directly to the portable unit when the user is outside of the vehicle. Alternatively, the user may specify that the incoming calls connect directly to a stereo or speaker system within the vehicle if the portable unit 18 and the user are inside the vehicle. In addition to telephone calls, the vehicle installed unit 14 also relays text messages and email/SMS messages to the portable unit 18.

The portable unit 18 communicates with the vehicle installed unit 14 through a wire connection, a wireless directly, or wireless indirectly through networks such as Wi-Fi. The portable unit 18 includes the emergency button 56 that initiates connection between the portable unit 18 and the vehicle installed unit 14 in the event of an emergency. Several modes of operation exist within the user interface on the portable unit 18. For example, the portable unit 18 includes a cell phone mode, which causes the portable unit 18 and the vehicle installed unit 14 to have features similar to a cell phone. The screen 60 may include a screen keyboard to dial a desired phone number.

Another mode of the portable unit 18 may include an email mode capable of sending short emails through the vehicle installed unit 14. Further, an SMS mode may be used to send SMS messages. Navigation modes may allow the user to enter destination data within the portable unit 18 and to initiate a navigation session with a navigation server through the wireless hub 68. Further, the portable unit 18 may include a vehicle search mode that allows the user to map the location of the vehicle installed unit 14 and associated vehicle on a map which is then displayed on the screen 60. The portable unit 18 also enables the user to inquire about the status of their vehicle through the vehicle installed unit 14 communicating wirelessly with the portable unit 18. For example, the user may query the vehicle installed unit 14 to compile and send a report relating to vehicle operating conditions, an engine on/off condition, the doors locked or unlocked, etc.

Figure 2:
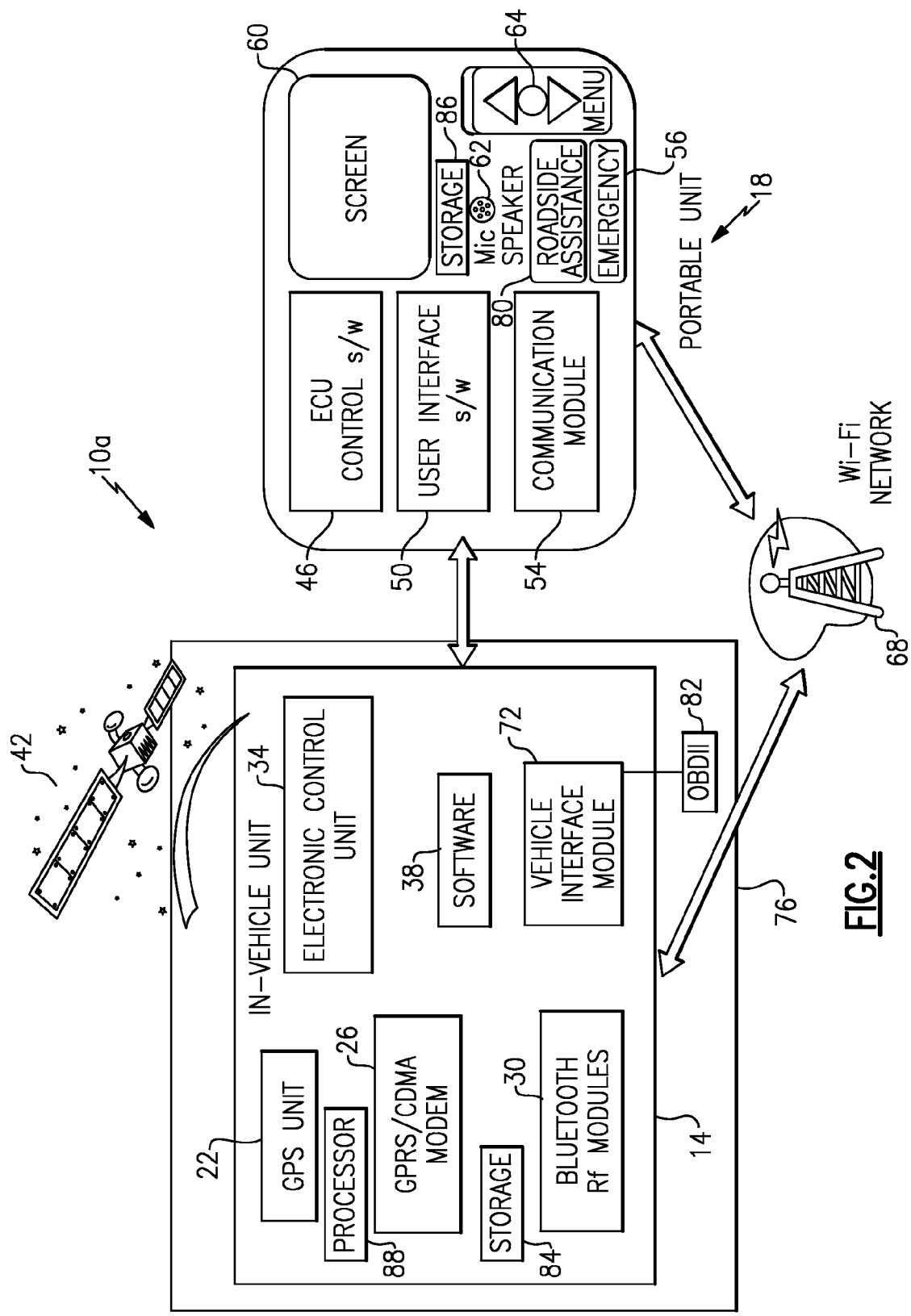
FIG. 2 schematically shows another example method of communicating between a vehicle installed unit and a portable unit.

Referring now to FIG. 2, another example vehicle communication device 10*a* includes a vehicle interface module 72 that connects to a diagnostic system, a control system, or both, within a vehicle 80, such as an On-Board Diagnostics (OBDII) 82 or CANBUS system. The connection between the vehicle interface module 72 and the OBDII may be a wired or wireless connection. As known, such systems facilitate obtaining information about the vehicle 76 and certain functions of the vehicle 80. The portable unit 18 may include the vehicle interface module 72.

The portable unit 18 thus obtains diagnostic information about the vehicle 76 and other vehicle status-related information, such as the location of the vehicle or whether the vehicle doors are locked. The example portable unit 18 can immobilize the vehicle 80 through the OBDII by sending the vehicle 76 an SMS or similar message, or by establishing an connection through Wi-Fi, GPRS or a proprietary wireless communication link.

The vehicle interface module 72 is also switchable between modes such as an in-vehicle interface mode, which allows the user easy and quick access to vehicle related functions like an MP3 Player, vehicle navigation, trip metering menu, download of vehicle diagnostics.

An example storage location 84 is wired or wirelessly connected to the vehicle 76, the OBDII 82 connection, or both. The storage 84 contains a table of information, which can include historical and identifying information such as the vehicle make, the vehicle color, the vehicle year of manufacture, information about vehicle owner, photographs of the owner, or even a detailed corporate info if the vehicle 76 is owned by a company. In this example, the storage 84 also contains the usage classification, (e.g. (diplomatic, security, clearance class, etc.) and whether the vehicle can be driven in a certain area. Other stored information may include an account of traffic violations, security violations, environmental violations, and emission violations associated with the vehicle 76. The portable unit 18 may include another storage location 86 for storing similar data, especially driver-specific data.

The OBDII module 82 and the vehicle interface module 72 also exchange time stamped information. For example, the OBDII module 82 may send the VIN number, updated odometer reading, updated fuel reading, other vehicle specific data to the vehicle interface module 72, which in turn can send the last recorded estimate of the odometer reading, vehicle last GPS location to the OBDII module 82.

In this example, a processor 88 within the vehicle installed unit 14 runs software to compare the exchanged information and to identify discrepancies between odometer readings, GPS coordinates, fuel levels etc. due to driving the vehicle 76 when the device 10a is disconnected or dysfunctional, for example. In addition to the antitampering software, additional software monitors connectivity with portable unit 18, the odometer readings, and movements of the vehicle 76, such as speeds and distance driven. The software may include a validation algorithm for verifying that the appropriate system is in the appropriate vehicle. In one example, the validation algorithm compares a stored vehicle identification number to the actual vehicle identification number. In one example the OBDII module 82 also includes a processor for running comparative software. A person skilled in the art would know how to select appropriate software for performing such comparative tasks.

The device 10a also facilitates using more than one portable unit 18 with the vehicle installed unit 14. The example portable unit 18 can be assigned to a specific driver to allow for driver specific vehicle usage reporting. If multiple drivers drive a particular vehicle 76, each driver may be assigned a specific portable unit. In such an example, the portable unit 18 is assigned to one driver and the presence of the portable unit 18 within the vehicle 76 signifies that any vehicle 76 usage during this time should be associated with that driver.

Use of the vehicle 76 without presence of any portable unit 18 can be assigned to a default driver or to an unknown driver. Known methods of password authentication may be used to link the portable unit 18 to the vehicle installed unit 14 to ensure that the driver assignment is correct. In such an example, the driver would not be able to assign usage to another driving the vehicle 76 with another driver's portable unit 18.

As the vehicle installed unit 14 is capable of wireless communications, traffic and security personnel may wirelessly connect with vehicle installed unit 14 to determine if the vehicle 76 has been involved in any traffic violations. As discussed, such information may be contained with the storage 84. Connecting directly to the vehicle 76 enables such personnel to identify violators of traffic rules without laboriously stopping, asking, and searching the vehicle 76. Connecting to the vehicle installed unit 14 also facilitates determining whether the vehicle 76 has the security clearance to be in a given area.

The example portable unit 18 includes a roadside assistance button 80 for initiating messages to the vehicle 80 to the wireless network hub 68, for example.

The example portable unit 18 within the device 10a also supports trip logging, which allows the user to develop new trips, label trips, indicate trip ends, and map trips by storing a map of vehicle movement in the trip log.

Although a preferred embodiment of this invention has been disclosed, a worker of ordinary skill in this art would recognize that certain modifications would come within the scope of this invention. For that reason, the following claims should be studied to determine the true scope and content of this invention.

I claim:

1. A vehicle communication device, comprising:
   a vehicle installed unit;
   a vehicle interface module within the vehicle installed unit for connecting to a vehicle system; and
   a portable unit in communication with the vehicle installed unit, wherein the portable unit communicates with the vehicle interface module to obtain information from the vehicle system, wherein the vehicle installed unit identifies discrepancies between information from the portable unit and information from the vehicle system,
   wherein the discrepancies comprise discrepancies between a fuel reading stored on the vehicle and a fuel reading stored on the portable unit.

2. The vehicle communication device of claim 1, wherein the vehicle system is an OBDII system or a CANBUS system.

3. The vehicle communication device of claim 1, wherein at least one of the vehicle installed unit and the portable unit includes storage location for storing historical data.

4. The vehicle communication device of claim 3, wherein the vehicle installed unit includes a controller for running a program that compares historical data with newly acquired data.

5. A vehicle communication method, including the steps of:
   selecting a portable unit from a plurality of portable units that are each configured to wirelessly communicate with a vehicle;
   linking a driver to the vehicle based on the selected portable unit;
   operating the vehicle;
   storing vehicle information based on the driver, the selected portable unit, or both; and
   identifying discrepancies between vehicle information stored within the portable unit and vehicle information stored within the vehicle using a vehicle installed unit,
   wherein the discrepancies comprise at least one of discrepancies between an odometer reading stored on the vehicle and an odometer reading stored on the portable unit, discrepancies between information from the portable unit and information from the vehicle system, or discrepancies between a fuel reading stored on the vehicle and a fuel reading stored on the portable unit.

6. The vehicle communication method of claim 5, gathering the vehicle information wirelessly.

7. The vehicle communication method of claim 5, including authenticating the driver using a password.

8. The vehicle communication method of claim 5, including identifying discrepancies between the portable unit linked to the vehicle.

9. The vehicle communication method of claim 8, wherein the discrepancies are identified in at least one of the VIN number of the vehicle, the odometer reading of the vehicle, the fuel reading of the vehicle.

10. The vehicle communication device of claim 1, including a controller for executing an algorithm that verifies the vehicle system.

11. The vehicle communication device of claim 10, wherein the portable unit communicates with the vehicle installed unit to obtain an actual vehicle identification number, wherein the algorithm executed by the controller compares a stored vehicle identification number to the actual vehicle identification number.

12. The vehicle communication device of claim 4, wherein the controller identifies discrepancies between the historical data and the newly acquired data.

13. A vehicle communication device, comprising:
a vehicle installed unit;
a vehicle interface module within the vehicle installed unit in communication with a vehicle system within a vehicle; and
a storage location within the vehicle installed unit, the storage location providing storage for information associated with the vehicle and for information associated with an individual, wherein the individual is determined based on a presence of a particular portable unit, wherein the vehicle installed unit identifies discrepancies between information from the portable unit and information from the vehicle, system wherein the discrepancies comprise discrepancies between an odometer reading stored on the vehicle and an odometer reading stored on the portable unit.

14. The communication device of claim 13, wherein the information associated with the vehicle includes historical information associated with the vehicle.

15. The communication device of claim 14, wherein the historical information includes at least one of a traffic violation by the vehicle, a security violation by the vehicle, an emission violation by the vehicle, and an environmental violation by the vehicle.

16. The communication device of claim 13, wherein the information associated with the vehicle includes identifying information associated with the vehicle.

17. The communication device of claim 16, wherein the identifying information includes at least one of a make of the vehicle, a model of the vehicle, a color of the vehicle, and a year of manufacture of the vehicle.

18. The communication device of claim 16, wherein the identifying information include a photograph of a person associated with vehicle.

19. The communication device of claim 16, wherein the identifying information includes a usage classification for the vehicle.

20. The communication device of claim 13, wherein the information associated with the vehicle includes clearance information for a geographic area.

21. The vehicle communication device of claim 1, wherein the discrepancies include a discrepancy between an odometer reading on the vehicle installed unit and an odometer reading on the portable unit.

22. The vehicle communication device of claim 1, including a storage location within the vehicle installed unit, the storage location providing storage for information that is associated with an individual, wherein the individual is determined based on a presence of a particular portable unit.

23. The communication device of claim 13, wherein the vehicle installed unit identifies discrepancies between information from the portable unit and information from the vehicle system.

24. The vehicle communication device of claim 1, wherein the information from the portable unit was communicated from the portable unit to the vehicle installed unit before the vehicle installed unit identifies discrepancies.

25. The vehicle communication method of claim 5, communicating information stored within the portable unit to the vehicle installed unit prior to the identifying.

26. The vehicle communication method of claim 5, wherein the discrepancies are between a VIN number stored on the vehicle and a VIN number stored on the portable unit.

27. The communication device of claim 13, wherein the vehicle installed unit identifies discrepancies between information from the portable unit and information from the vehicle system.

28. The communication device of claim 23, wherein the discrepancies comprises discrepancies between a fuel reading stored on the vehicle and a fuel reading stored on the portable unit.

* * * * *